United States Patent
Kakui

(10) Patent No.: US 7,876,794 B2
(45) Date of Patent: Jan. 25, 2011

(54) LASER LIGHT SOURCE

(75) Inventor: Motoki Kakui, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/529,580

(22) Filed: Sep. 29, 2006

(65) Prior Publication Data

US 2007/0087252 A1   Apr. 19, 2007

(30) Foreign Application Priority Data

Sep. 29, 2005   (JP)   ............................ P2005-284281

(51) Int. Cl.
*H01S 3/11* (2006.01)
(52) U.S. Cl. ................ 372/10; 372/6; 372/25; 372/29.01; 372/29.011; 372/29.012; 372/71; 372/94
(58) Field of Classification Search .................. 372/10, 372/6, 25, 29.01, 29.011, 29.012, 71, 94
See application file for complete search history.

(56) References Cited

U.S. PATENT DOCUMENTS

| | | | | |
|---|---|---|---|---|
| 4,918,704 | A * | 4/1990 | Caprara et al. | 372/99 |
| 4,930,901 | A * | 6/1990 | Johnson et al. | 372/26 |
| 5,394,415 | A * | 2/1995 | Zucker et al. | 372/26 |
| 6,064,515 | A * | 5/2000 | Yang | 359/341.33 |
| 6,603,600 | B2 * | 8/2003 | Pang | 359/348 |

FOREIGN PATENT DOCUMENTS

| | | |
|---|---|---|
| JP | 59-39958 | 3/1984 |
| JP | 60-102785 | 6/1985 |
| JP | 01-181584 | 7/1989 |
| JP | 7-231131 A | 8/1995 |
| JP | 10-190117 | 7/1998 |
| JP | 2001-189513 | 7/2001 |
| JP | 2001-332791 A | 11/2001 |
| JP | 3331726 | 7/2002 |

OTHER PUBLICATIONS

Japanese Notification of Reasons for Rejection, w/ English translation thereof, issued in Japanese Patent Application No. JP 2005-284281.

* cited by examiner

*Primary Examiner*—Minsun Harvey
*Assistant Examiner*—Yuanda Zhang
(74) *Attorney, Agent, or Firm*—McDermott Will & Emery LLP

(57) ABSTRACT

The present invention discloses a laser light source for implementing pulsed oscillation of laser light, which has a laser cavity in which a laser medium for generating emitted light with supply of excitation energy is placed on a resonance path; an excitation device for continuously supplying excitation energy to the laser medium; a monitor part for monitoring a power of light extracted at a middle point of the path of the cavity from the laser medium in accordance with the supply of the excitation energy by the excitation device; a Q-switch for modulating a cavity loss of the laser cavity; and a control part for performing such control as to stabilize a peak power or an energy of laser light pulses outputted in a state in which the cavity loss of the laser cavity is set at a second predetermined loss for oscillation of high-power pulses, based on the power of the emitted light monitored by the monitor part in a state in which the cavity loss of the laser cavity is set at a first predetermined loss for non-oscillation of high-power pulses.

18 Claims, 9 Drawing Sheets

| PULSE # | 1 | 2 | 3 | 4 | 5 | 6 | 7 | 8 | 9 | 10 |
|---|---|---|---|---|---|---|---|---|---|---|
| PEAK POWER (W) | 1341 | 1335 | 1405 | 1323 | 1422 | 1304 | 1447 | 1307 | 1481 | 1328 |
| PULSE ENERGY(J) | 1.21E-04 | 1.14E-04 | 1.09E-04 | 1.15E-04 | 1.08E-04 | 1.16E-04 | 1.07E-04 | 1.18E-04 | 1.05E-04 | 1.20E-04 |

Fig.4

LASER LIGHT SOURCE

BACKGROUND OF THE INVENTION

1. Field of the Invention

The present invention relates to a laser light source for implementing pulsed oscillation of laser light.

2. Related Background Art

A laser light source for implementing pulsed oscillation of laser light is provided with a laser cavity in which a laser medium for generating emitted light with supply of excitation energy is placed on a resonance path, a Q-switch device for modulating a cavity loss of the laser cavity, and an excitation device for continuously supplying the excitation energy to the laser medium.

This laser light source is configured as follows: while the cavity loss of the laser cavity is set at a large value by the Q-switch device, the population inversion of the laser medium is enhanced with supply of excitation energy by the excitation device; when the cavity loss of the laser cavity is then set to a smaller value by the Q-switch device, induced emission occurs in a short period of time in the laser medium placed on the resonance path of the laser cavity. This induced emission is outputted as laser light from the laser cavity to the outside.

Since such laser light sources are able to output pulsed laser light with a high peak power, they are commonly used in electronic and mechanical processing applications, medical laser knives, measurement applications such as measurement of length, and so on. For example, in the processing applications, the radiated laser light for processing is required to achieve the stability of output power of about 5% p-p. However, the conventional laser light sources do not always achieve satisfactory stability of pulse output.

Which is important between energy and power of pulsed laser light is dependent upon types of processing such as welding or cutting, and upon types of machined objects. As a general tendency, importance is attached to the energy of the pulsed laser light in cases of conventional thermal processing. In contrast to it, the power density ($W/cm^2$) of pulsed laser light is also an important factor in processing applications requiring femtosecond pulses, e.g., ablation, and efficiency of absorption of pulsed laser light is drastically improved at the power density of over $10^{15}$ $W/cm^2$.

Japanese Patent No. 3331726 and Japanese Patent Application Laid-Open No. 2001-332791 disclose the laser light sources intended for stabilizing the energy or power of output pulsed laser light. In the laser light sources disclosed in these documents, part of pulsed laser light outputted from the laser cavity to the outside is branched and extracted, and the power of the pulsed laser light branched and extracted is monitored. Then feedback control is performed so as to stabilize the energy or power of the output pulsed laser light, based on the result of monitoring.

However, the laser light sources adapted for feedback control as disclosed in the above-described Documents 1, 2 were not always satisfactory in terms of the energy or power of the output pulsed laser light.

SUMMARY OF THE INVENTION

An object of the present invention is to provide a laser light source improved in stabilization of energy or power of output pulsed laser light.

A laser light source according to an embodiment of the present invention is a laser light source for implementing pulsed oscillation of laser light, comprising: (1) a laser cavity in which a laser medium for generating emitted light with supply of excitation energy is placed on a resonance path; (2) exciting means for continuously supplying excitation energy to the laser medium; (3) a monitor part for monitoring a power of light extracted at a middle point of the path of the cavity from the laser medium in accordance with the supply of the excitation energy by the exciting means; (4) Q-switch means for modulating a cavity loss of the laser cavity; and (5) a control part for performing such control as to stabilize a peak power or an energy of laser light pulses outputted in a state in which the cavity loss of the laser cavity is set at a second predetermined loss for oscillation of high-power pulses, based on a power of emitted light monitored by the monitor part in a state in which the cavity loss of the laser cavity is set at a first predetermined loss for non-oscillation of high-power pulses.

In the laser light source according to the embodiment, when the exciting means supplies the excitation energy to the laser medium, the laser medium generates the emitted light and the monitor part monitors the power of the light extracted at the middle point of the path of the cavity. The laser cavity, in which the laser medium is placed on the resonance path, is arranged so that the cavity loss is modulated by the Q-switch means, and the laser cavity outputs pulses of laser light in the state in which the cavity loss is set at the second predetermined loss for oscillation of high-power pulses. Then the control part performs such control as to stabilize the peak power or the energy of the laser light pulses outputted when the cavity loss of the laser cavity is minimum, based on the emitted light power monitored by the monitor part in the state in which the cavity loss is set at the first predetermined loss for non-oscillation of high-power pulses.

In the laser light source according to the embodiment, preferably, the control part performs feedback control of a physical parameter in the cavity which affects an output characteristic of the laser light source on the basis of the power of the emitted light monitored by the monitor part, thereby stabilizing the peak power or the energy of the output laser light. The physical parameter herein can be the excitation energy, an oscillation wavelength of the cavity, a reflectance of the cavity, or a loss of the Q-switch means (a branching ratio of the Q-switch means). In this case, the peak power or the energy of the output laser light is stabilized by the feedback control of the physical parameter in the cavity which affects the output characteristic of the laser light source, based on the emitted light power monitored by the monitor part.

The laser light source according to the embodiment is preferably arranged as follows: it further comprises an output light power adjuster for amplifying or attenuating the laser light outputted from the laser cavity; the control part controls a gain or a loss of the output light power adjuster, thereby stabilizing the peak power or the energy of the output laser light. In this case, the peak power or the energy of the output laser light is stabilized by the control of the gain or the loss of the output light power adjuster provided in an output stage of the laser cavity.

The laser light source according to the embodiment is preferably arranged as follows: it has the Q-switch means, and the Q-switch means is so arranged that a pair of ports form a part of the laser cavity and that a remaining port is used for monitoring part of an optical power in the laser cavity. The optical switch is preferably one making use of the acoustooptic effect, one making use of the electrooptic effect, or one making use of the piezooptic effect.

The laser light source according to the embodiment is preferably arranged as follows: the control part performs control based on the power of the emitted light monitored by the monitor part at an end of a period in which the cavity loss is set at the first predetermined loss, thereby stabilizing the peak power or the energy of the output laser light. In this case, the peak power or the energy of the output laser light is further stabilized.

BRIEF DESCRIPTION OF THE DRAWINGS

FIG. 4 is a table showing a peak power and an energy per pulse for each of output pulses from the laser light source 1 without execution of stabilization control by control part 10.

DESCRIPTION OF EMBODIMENTS

Embodiments will be described below in detail with reference to the accompanying drawings. In the description of the drawings the same elements will be denoted by the same reference symbols, without redundant description.

(First Embodiment)

Figure 1:
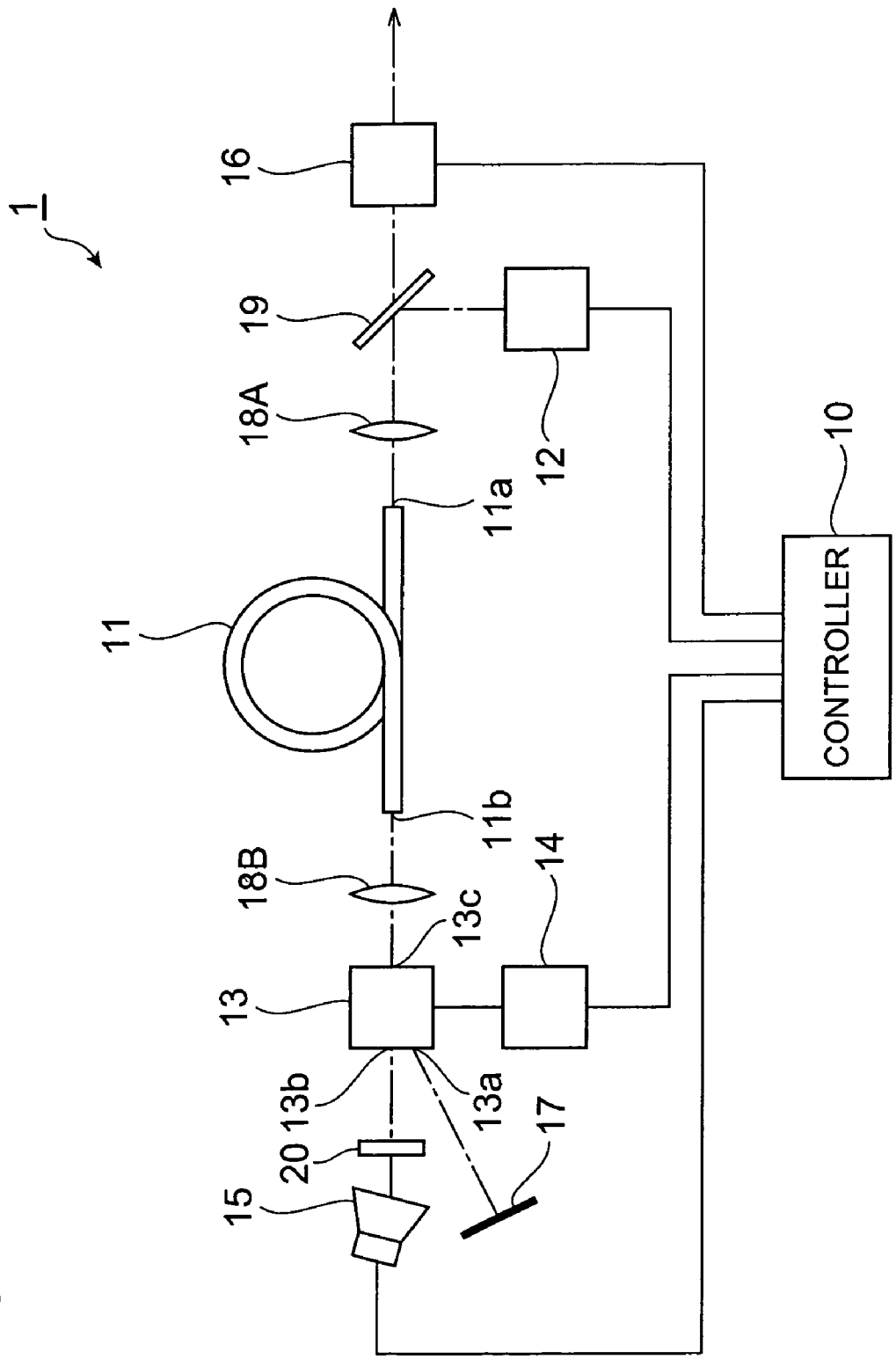
FIG. 1 is a configuration diagram of a laser light source 1 according to a first embodiment.

First, the first embodiment of the laser light source will be described. FIG. 1 is a configuration diagram of the laser light source 1 according to the first embodiment. The laser light source 1 shown in this figure is provided with a control part 10, an optical amplifying fiber 11, an excitation light source 12, an optical switch 13, a drive circuit 14, a monitor part 15, an output light power adjuster 16, a total reflection mirror 17, a lens 18A, a lens 18B, and a dichroic mirror 19.

The optical amplifying fiber 11 is an optical fiber in which an optical waveguide region is doped with a fluorescent element, and the fluorescent element emits fluorescence with supply of excitation light (pump light) of a wavelength capable of exciting the fluorescent element. This fluorescent element is preferably a rare-earth element, and among others, it is preferably Er, Yb, or the like. One end face 11a of the optical amplifying fiber 11 is a vertical cleavage plane, and the other end face 11b of the optical amplifying fiber 11 is coated with a non-reflecting coating.

The excitation light source 12 continuously outputs excitation light for exciting the fluorescent element added in the optical amplifying fiber 11. This excitation light source 12 preferably includes a laser diode. The dichroic mirror 19 receives the excitation light outputted from the excitation light source 12 and reflects the excitation light to the lens 18A. The lens 18A receives the excitation light coming from the dichroic mirror 19, and focuses and injects the excitation light into the end face 11a of the optical amplifying fiber 11. The lens 18A also receives light emitted from the fluorescent element in the optical amplifying fiber 11 and outputted from the end face 11a, collimates the light, and feeds the collimated light to the dichroic mirror 19. The dichroic mirror 19 receives the light coming from the lens 18A and transmits this light.

The optical switch 13 has a first port 13a, a second port 13b, and a third port 13c. The first port 13a is optically connected to the total reflection mirror 17, the second port 13b to the monitor part 15, and the third port 13c through the lens 18B to the end face 11b of the optical amplifying fiber. The optical switch 13 operates as actuated by the drive circuit 14, and one of a first optical path between the first port 13a and the third port 13c and a second optical path between the second port 13b and the third port 13c is selectively turned into an optically transmittable state.

This optical switch 13 may be one making use of the acoustooptic effect, one making use of the electrooptic effect, or one making use of the piezooptic effect (e.g., one available from CVI Laser Corporation). When the optical switch 13 is one making use of the acoustooptic effect, the light outputted from the end face 11b of the optical amplifying fiber 11 is fed to the monitor part 15 without being diffracted, during periods in which no high-frequency voltage is applied to the optical switch 13, and the light outputted from the end face 11b of the optical amplifying fiber 11 is diffracted and fed to the total reflection mirror 17 during periods in which a high-frequency voltage is applied to the optical switch 13. Conversely, the laser light source may be arranged as follows: the light outputted from the end face 11b of the optical amplifying fiber 11 is fed to the total reflection mirror 17 without being diffracted, during periods in which no high-frequency voltage is applied to the optical switch 13, and the light outputted from the end face 11b of the optical amplifying fiber 11 is diffracted and fed to the monitor part 15 during periods in which a high-frequency voltage is applied to the optical switch 13.

The lens 18B receives the light outputted from the end face 11b of the optical amplifying fiber 11 and injects this light into the third port 13c of the optical switch 13. The lens 18B also receives light outputted from the third port 13c of the optical switch 13 and injects this light into the end face 11b of the optical amplifying fiber 11. The total reflection mirror 17 totally reflects the light outputted from the first port 13a of the optical switch 13 and injects the reflected light into the first port 13a of the optical switch 13.

The monitor part 15 receives the light outputted from the second port 13b of the optical switch 13 and monitors the power of the received light. In order to prevent light reflected on a light-receiving surface of the monitor part 15 from returning to the second port 13b of the optical switch 13, the light-receiving surface of the monitor part 15 is preferably not normal to the optical axis of the light coming from the second port 13b of the optical switch 13 and the reflectance of the light-receiving surface of the monitor part 15 is preferably not more than −40 dB. There is little residual excitation light if a product of concentration and length (CL product) of the optical amplifying fiber 11 is sufficiently large; whereas residual excitation light is outputted from the end face 11b of the optical amplifying fiber 11 if the CL product of the optical amplifying fiber 11 is small; therefore, it is preferable to provide an optical filter 20 for interruption of excitation light between the optical switch 13 and the monitor part 15.

The output light power adjuster 16 receives the light outputted from the end face 11a of the optical amplifying fiber 11 and transmitted by the lens 18A and dichroic mirror 19, amplifies or attenuates this light, and outputs the amplified or attenuated light. Namely, the output light power adjuster 16 is an optical amplifier or optical attenuator. The amplification rate or attenuation rate of the output light power adjuster 16 is variable.

The control part 10 imports the monitoring result of the light monitored by the monitor part 15, controls output of the excitation light from the excitation light source 12, controls the setting of the state of the optical switch 13 by the drive circuit 14, and controls adjustment of optical power by the output light power adjuster 16.

In the laser device 1 constructed as described above, the excitation light continuously outputted from the excitation light source 12 is reflected by the dichroic mirror 19, focused by the lens 18A, and injected into the end face 11a of the optical amplifying fiber 11 being a laser medium, to excite the fluorescent element added in the optical amplifying fiber 11. Namely, these components act as an exciting means for continuously supplying the excitation energy to the optical amplifying fiber 11 as a laser medium.

When the first optical path between the first port 13a and the third port 13c of the optical switch 13 is in the optically transmittable state, the optical system between the end face 11a of the optical amplifying fiber 11 and the total reflection mirror 17 constitutes a Fabry-Perot laser cavity, and the optical amplifying fiber 11 is placed as a laser medium on the resonance path of the laser cavity. When the second optical path between the second port 13b and the third port 13c of the optical switch 13 is in the optically transmittable state, the cavity loss of the laser cavity is maximum and thus the light outputted from the optical amplifying fiber 11 as a laser medium is monitored by the monitor part 15. In this manner, the optical switch 13 and drive circuit 14 act as a Q-switch means for modulating the cavity loss of the laser cavity, and enable the laser cavity to output pulsed laser light.

Then the control part 10 performs such control as to stabilize a peak power or an energy of laser light pulses outputted in a state in which the cavity loss of the laser cavity is set at a second predetermined loss for oscillation of high-power pulses (i.e., in the state in which the first optical path is in the optically transmittable state), based on the optical power of the light monitored by the monitor part 15 in a state in which the cavity loss of the laser cavity is set at a first predetermined loss for non-oscillation of high-power pulses (i.e., in the state in which the second optical path is in the optically transmittable state). More preferably, the control part 10 performs control to stabilize the peak power or the energy of the laser light outputted at a time when the cavity loss of the laser cavity is minimum, based on the optical power of the light monitored by the monitor part 15 at a time immediately before the time when the cavity loss of the laser cavity is minimum.

More specifically, the control part 10 controls the magnitude of the excitation energy supplied from the excitation light source 12 to the optical amplifying fiber 11, to stabilize the peak power or the energy of the output laser light. Alternatively, the control part 10 controls a gain or a loss of the output light power adjuster 16 to stabilize the peak power or the energy of the output laser light.

A specific configuration example of the laser light source 1 according to the first embodiment is as follows. The optical amplifying fiber 11 is an optical fiber in which an optical waveguide region is doped with Yb, and the excitation light source 12 outputs the excitation light in the 915 nm wavelength band capable of exciting Yb, whereupon the optical amplifying fiber 11 emits fluorescence in the 1.06 μm wavelength band. The optical amplifying fiber 11 is one having the following characteristics: the length is 10 m, the core diameter 10 μm, the internal cladding diameter 125 μm, and the unsaturated absorption in the 915 nm wavelength band 10.76 dB/m. The power of the excitation light in the 915 nm wavelength band supplied from the excitation light source 12 to the optical amplifying fiber 11 is 6.3 W. The optical switch 13 is one making use of the acoustooptic effect (AO switch), and the drive circuit 14 applies an RF voltage to the AO switch 13. The switching repetition frequency of the AO switch 13 is 10 kHz, and a required time for switching of the AO switch 13 is 500 ns.

Figure 2:
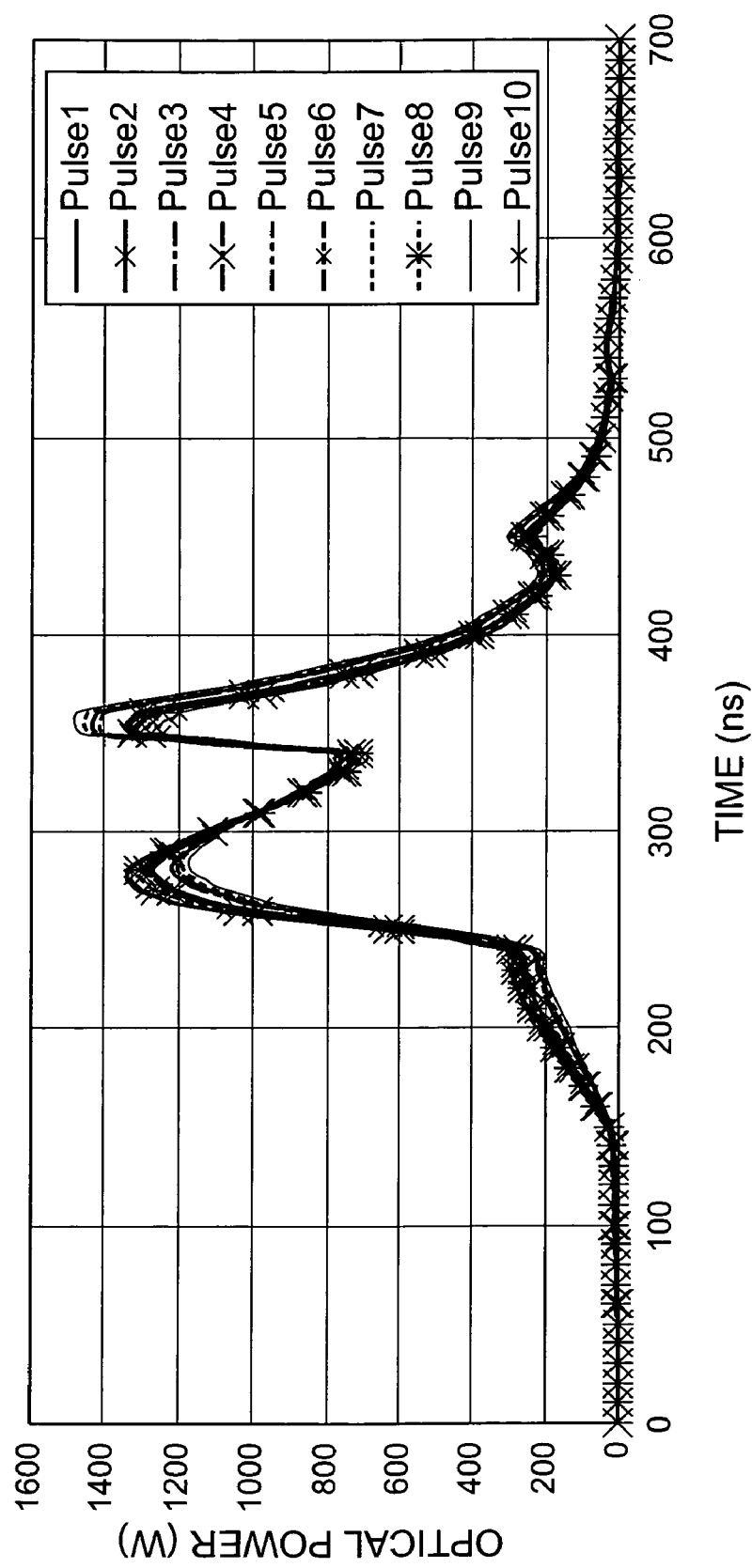
FIG. 2 is a drawing showing waveforms of output pulses from the laser light source I without execution of stabilization control by control part 10.
Figure 3:
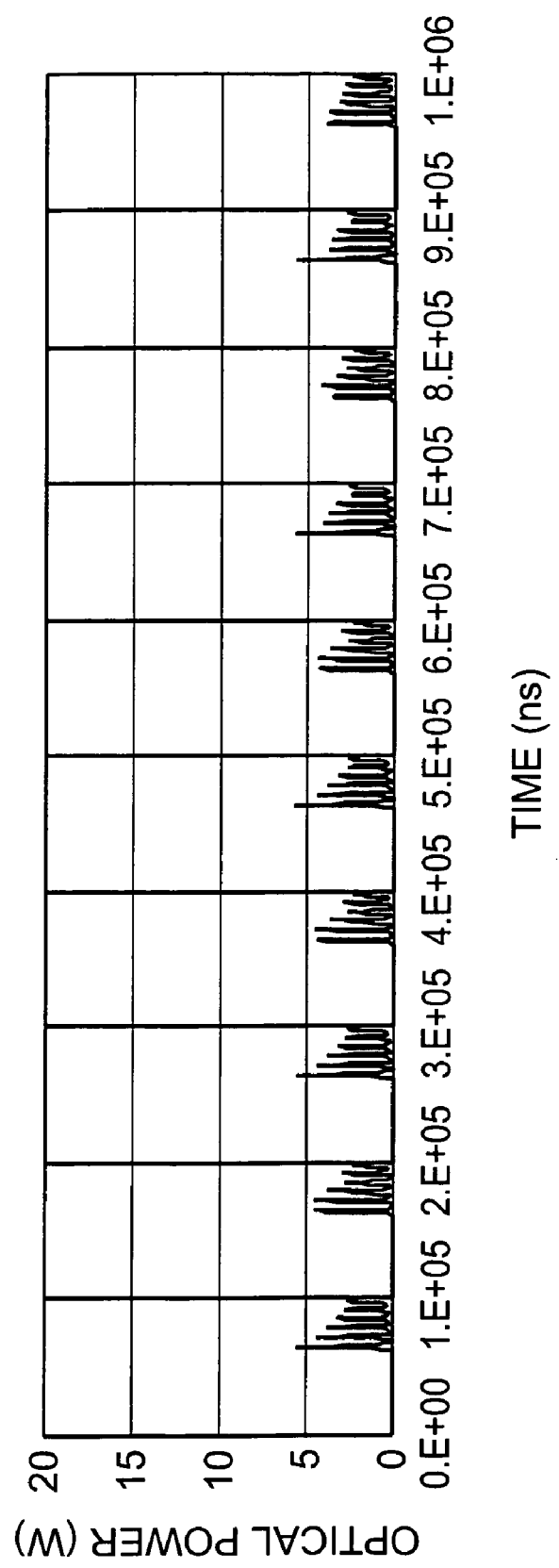
FIG. 3 is a drawing showing enlarged waveforms of output light in time zones except for pulse output periods of the laser light source 1 without execution of stabilization control by control part 10.

FIG. 2 is a drawing showing waveforms of output pulses from the laser light source 1 without execution of the stabilization control by the control part 10. FIG. 3 is a drawing showing enlarged waveforms of output light in time zones except for periods of pulse output from the laser light source 1 without execution of the stabilization control by the control part 10. FIG. 4 is a table showing a peak power and an energy per pulse as to each of output pulses from the laser light source 1 without execution of the stabilization control by the control part 10. In the case where the stabilization control by the control part 10 is not carried out, part of the light outputted from the end face 11b of the optical amplifying fiber 11 is reflected at the third port 13c of the AO switch 13 and the reflected light is incident to the end face 11b of the optical amplifying fiber 11; since the feedback ratio is approximately −23 dBc, the waveforms of output light from the laser light source 1 are like relaxation oscillation. It is seen as a general view from FIG. 4 that odd-number pulses are strong whereas even-number pulses are weak.

Figure 5:
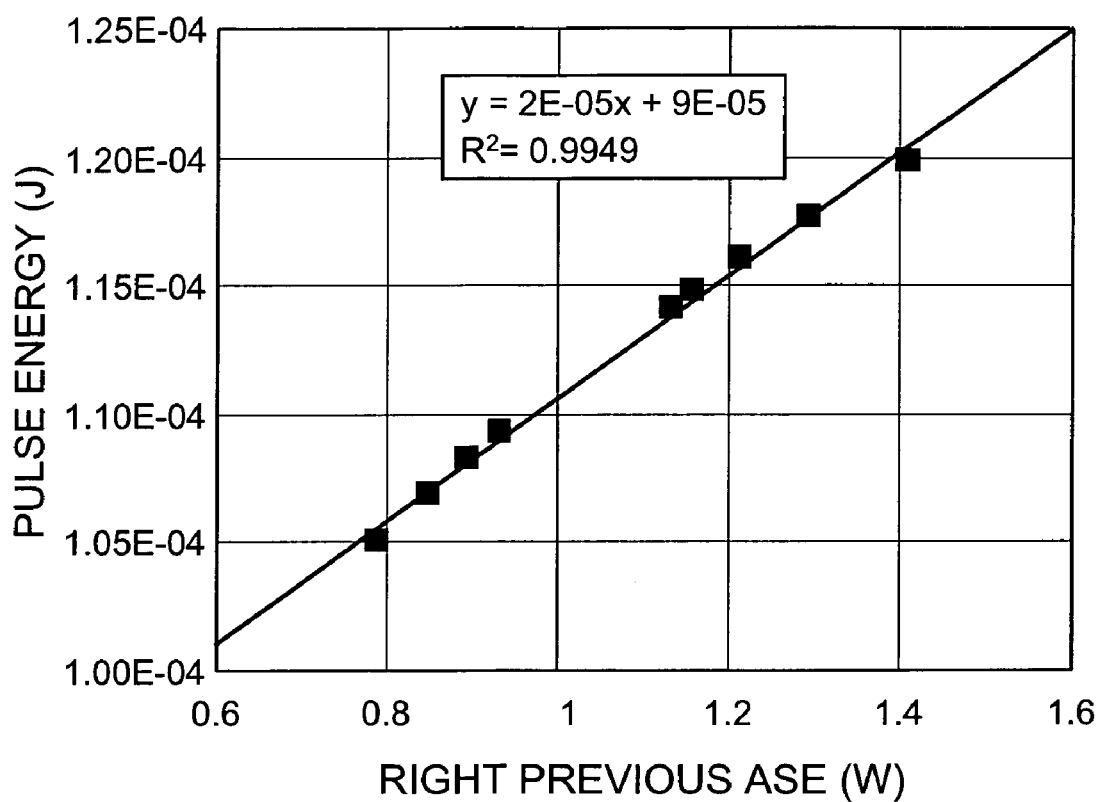
FIG. 5 is a drawing showing a relation between optical power values monitored by monitor part 15 at a time immediately prior to a minimum of cavity loss of a laser cavity in the laser light source 1, and energy values of output light pulses.
Figure 6:
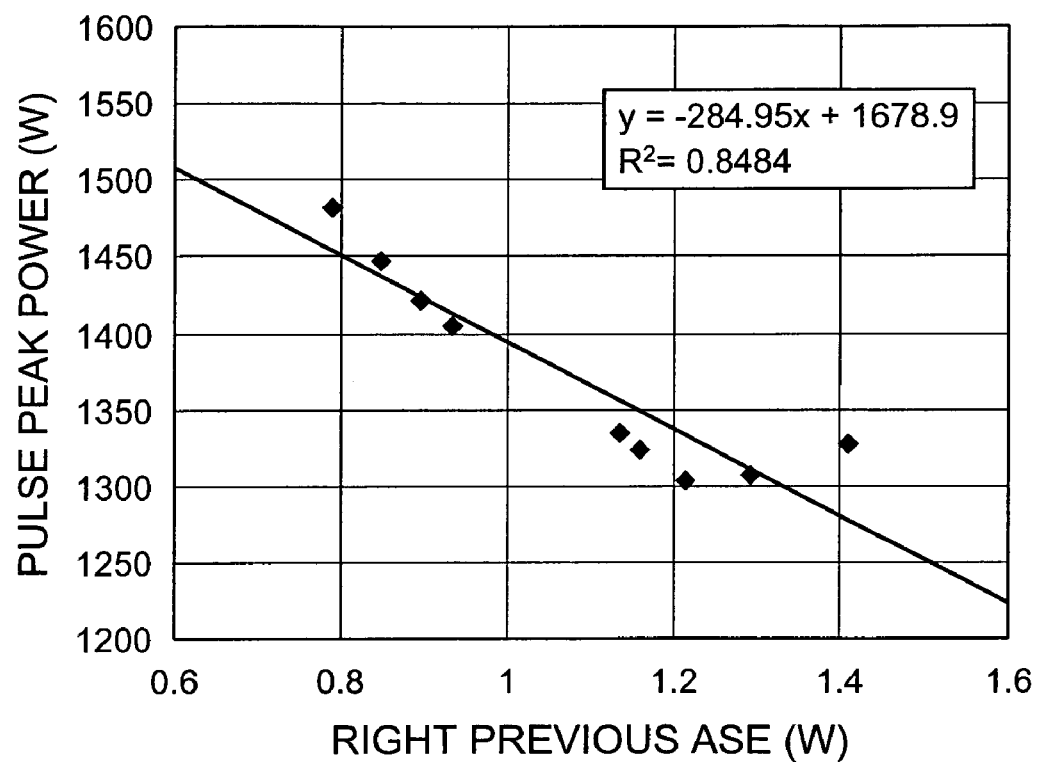
FIG. 6 is a drawing showing a relation between optical power values monitored by monitor part 15 at a time immediately prior to a minimum of cavity loss of the laser cavity in the laser light source 1, and peak power values of output light pulses.
Figure 7:
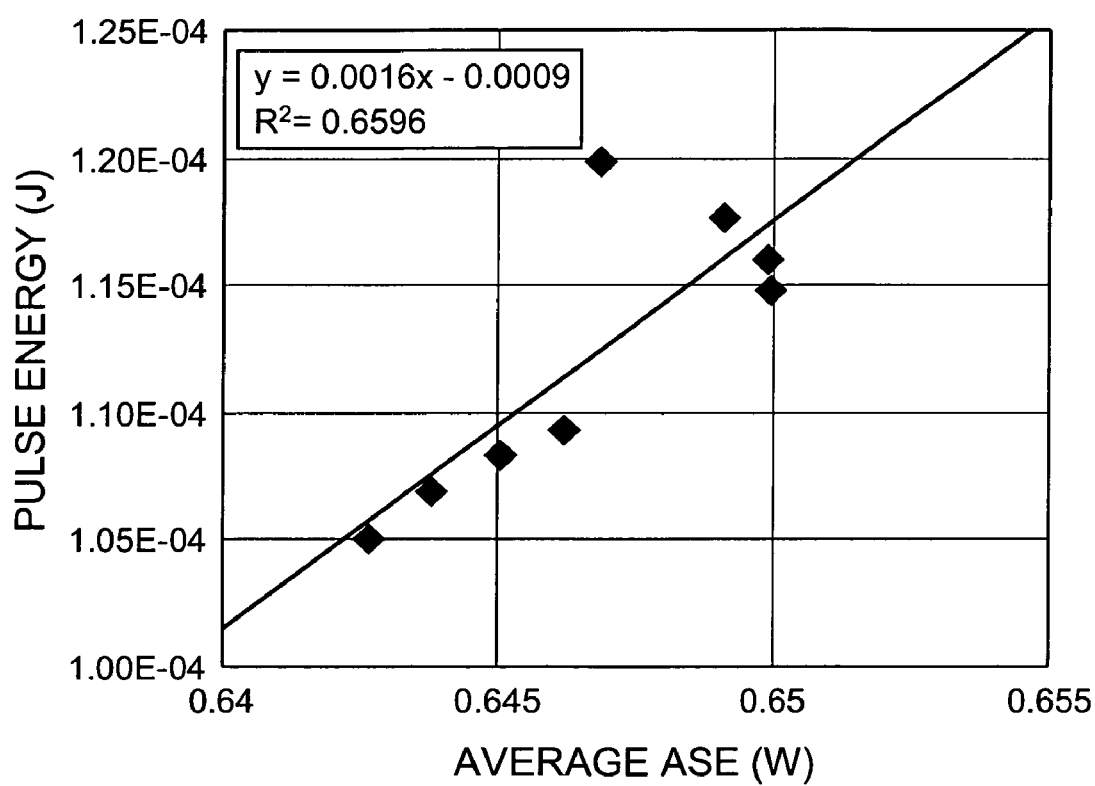
FIG. 7 is a drawing showing a relation between average values of optical powers monitored by monitor part 15 during a period in which the cavity loss of the laser cavity in the laser light source 1 is not minimum, and energy values of output light pulses.
Figure 8:
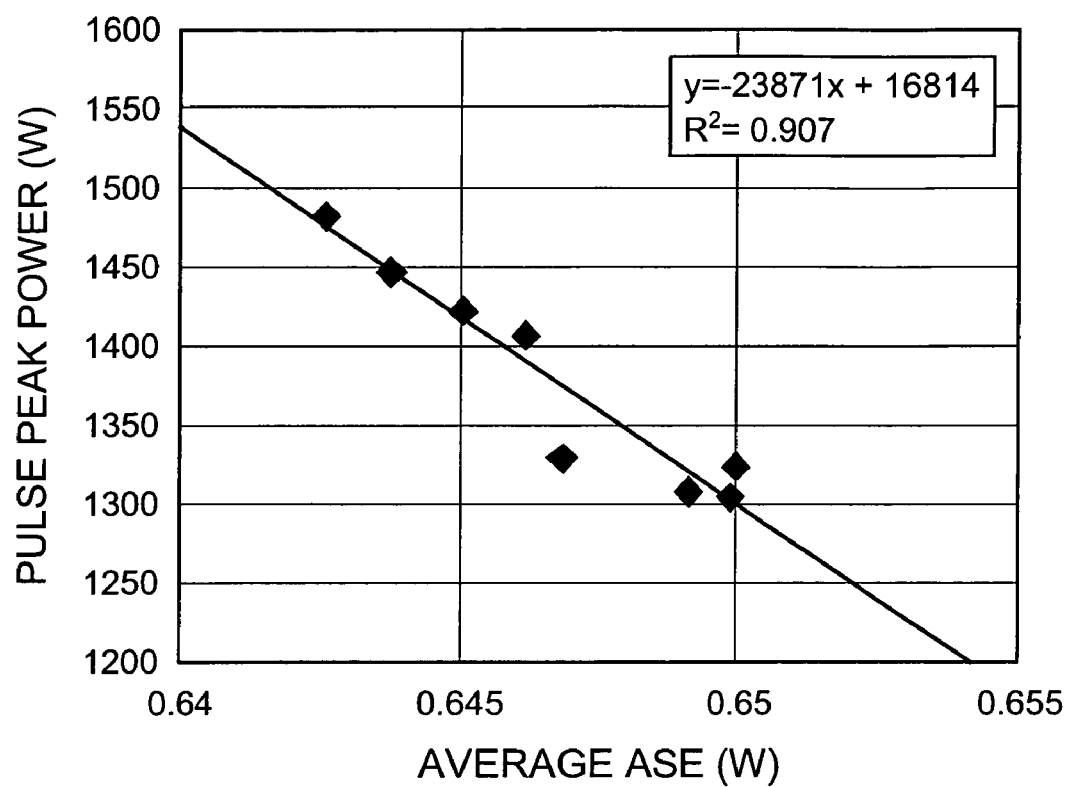
FIG. 8 is a drawing showing a relation between average values of optical powers monitored by monitor part 15 during a period in which the cavity loss of the laser cavity in the laser light source 1 is not minimum, and peak power values of output light pulses.

FIG. 5 is a drawing showing a relation between optical power values monitored by the monitor part 15 immediately before the cavity loss of the laser cavity in the laser light source 1 becomes minimum, and energy values of output pulse light. FIG. 6 is a drawing showing a relation between optical power values monitored by the monitor part 15 immediately before the cavity loss of the laser cavity in the laser light source I becomes minimum, and peak power values of output pulse light. FIG. 7 is a drawing showing a relation between average optical power values monitored by the monitor part 15 during periods in which the cavity loss of the laser cavity in the laser light source 1 is not minimum, and energy values of output pulse light. FIG. 8 is a drawing showing a relation between average optical power values monitored by the monitor part 15 during periods in which the cavity loss of the laser cavity in the laser light source 1 is not minimum, and peak power values of output pulse light.

The timing "immediately before the cavity loss of the laser cavity becomes minimum" is timing immediately before output of pulsed laser light from the laser cavity after the first optical path between the first port 13a and the third port 13c of the AO switch 13 is brought into the optically transmittable state. The periods in which the cavity loss of the laser cavity is not minimum are periods in which the first optical path is not in the optically transmittable state.

As seen from these figures, there are good correlations of the optical power values monitored by the monitor part 15 in the periods in which the cavity loss of the laser cavity in the laser light source 1 is not minimum (particularly, immediately before it becomes minimum), with the energy values or peak power values of output pulse light. Therefore, in cases such as thermal processing requiring stable pulse energy, the control part 10 performs feedforward control over output of excitation light from the excitation light source 12 or over adjustment of optical power by the output light power adjuster 16, based on the optical power values monitored by the monitor part 15 during periods in which the cavity loss of the laser cavity in the laser light source 1 is not minimum (particularly, immediately before it becomes minimum), whereby the pulse energy of output pulse light can be stabilized.

Since the control by the control part 10 in the laser light source 1 according to the present embodiment is the feedforward control, the correlation between output power values of excitation light from the excitation light source 12 or optical power adjustment amounts by the output light power adjuster 16, and pulse energies of output pulse light is measured in advance and stored in the control part 10. This correlation is preferably approximated by a linear function and in this case a load is small on a processor in the control part 10. The processor in the control part 10 is constructed, for example, of an FPGA (Field Programmable Gate Array). The processor in the control part 10 may perform an arithmetic operation according to the linear function representing the correlation, or may refer to a table storing the above correlation. The latter is preferred in terms of capability of high-speed processing.

Let us suppose that the feedback control as disclosed in Patent Document 1 should be performed. For example, suppose pulse #4 shown in FIG. 4 is monitored, the monitor detects the small peak power of the pulse #4, and the control part performs a feedback to increase the optical power of excitation light in order to increase the output on the basis of the detection. This would further increase the peak power of the next pulse #5, depending upon a delay of control, and could result in degrading the stability of pulse peak value. In contrast to it, the present embodiment is arranged to perform the feedforward control for individual pulses, and thus the peak power or the energy of each pulse can be stabilized.

Since the present embodiment does not require insertion of a branching coupler for monitoring the output laser light, the present embodiment reduces the number of parts and the number of connections, avoids a risk of optical damage, and suppresses an increase of insertion loss.

(Second Embodiment)

Figure 9:
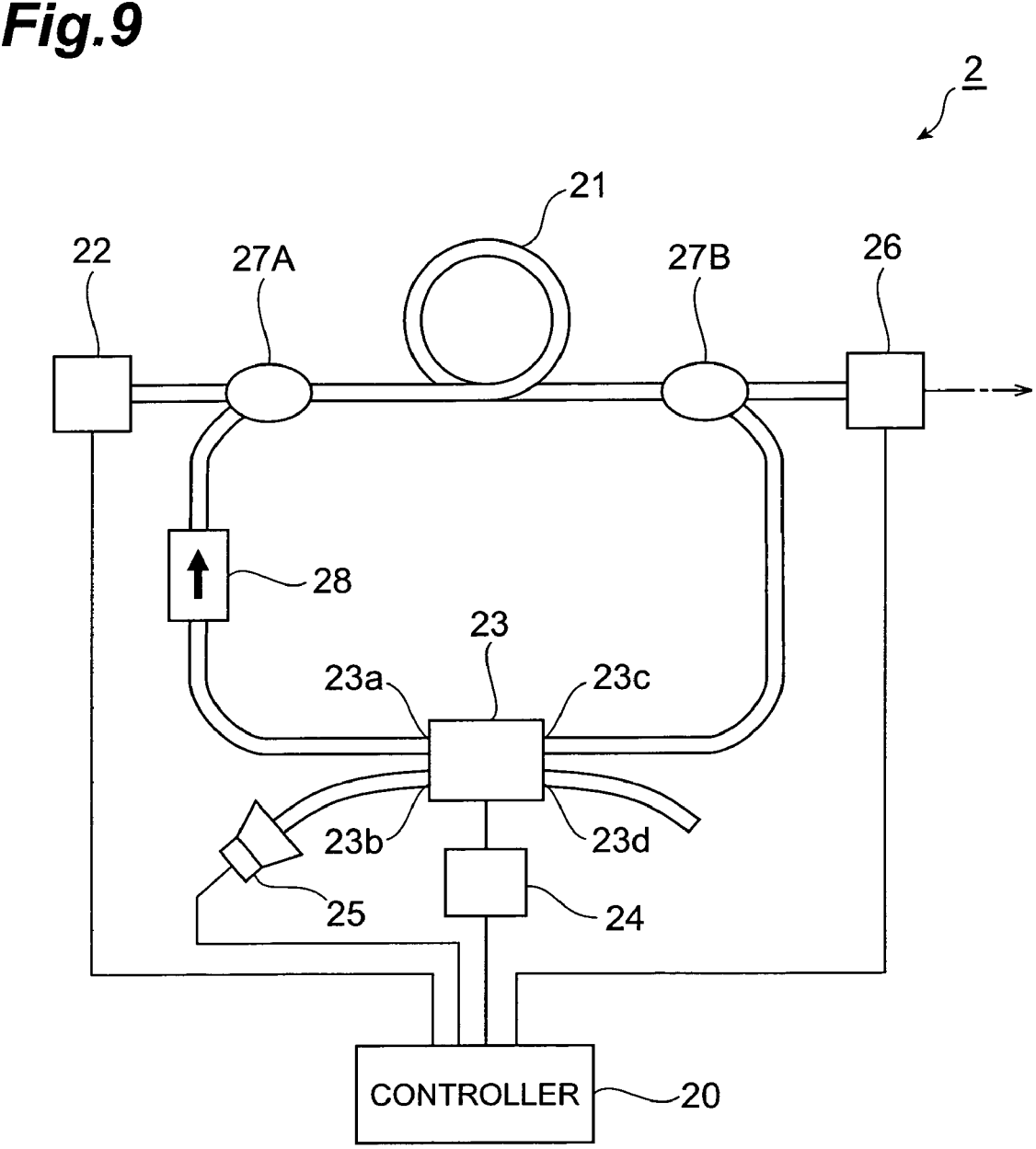
FIG. 9 is a configuration diagram of a laser light source 2 according to a second embodiment.

Next, the second embodiment of the laser light source according to the present invention will be described. FIG. 9 is a configuration diagram of the laser light source 2 according to the second embodiment. The laser light source 2 shown in this figure is provided with a control part 20, an optical amplifying fiber 21, an excitation light (pump light) source 22, an optical switch 23, a drive circuit 24, a monitor part 25, an output light power adjuster 26, an optical coupler 27A, an optical coupler 27B, and an optical isolator 28.

The optical amplifying fiber 21 is an optical fiber in which an optical waveguide region is doped with a fluorescent element, and the fluorescent element emits fluorescence with supply of excitation light of a wavelength capable of exciting the fluorescent element. This fluorescent element is preferably a rare-earth element, and among others, it is preferably Er, Yb, or the like. One end of the optical amplifying fiber 21 is connected to the optical coupler 27A, and the other end of the optical amplifying fiber 21 is connected to the optical coupler 27B.

The excitation light source 22 continuously outputs excitation light for exciting the fluorescent element added in the optical amplifying fiber 21. This excitation light source 22 preferably includes a laser diode. The optical coupler 27A receives the excitation light outputted from the excitation light source 22 and outputs the excitation light to the optical amplifying fiber 21. The optical coupler 27A receives light coming from the optical isolator 28 and outputs the light to the optical amplifying fiber 21.

The optical switch 23 has a first port 23a, a second port 23b, a third port 23c, and a fourth port 24d. The first port 23a is optically connected to the optical isolator 28, the second port 23b to the monitor part 25, the third port 23c to the optical coupler 27B, and the fourth port 23d is a reflection-free termination. The optical switch 23 operates as actuated by the drive circuit 24, and one of a first optical path between the first port 23a and the third port 23c and a second optical path between the second port 23b and the third port 23c is selectively turned into an optically transmittable state. This optical switch 23 is preferably one making use of the piezooptic effect, or may be one making use of the acoustooptic effect.

The monitor part 25 receives light outputted from the second port 23b of the optical switch 23 and monitors the power of the received light. There is little residual excitation light if the CL product of the optical amplifying fiber 21 is sufficiently large; whereas residual excitation light is outputted from the second port 23b of the optical switch 23 if the CL product of the optical amplifying fiber 21 is small; therefore, an optical filter for interruption of excitation light (not shown) is preferably provided between the optical switch 23 and the monitor part 25.

The optical coupler 27B receives light coming from the optical amplifying fiber 21, branches part of the light, outputs the branched part to the output light power adjuster 26, and outputs the rest to the third port 23c of the optical switch 23. The output light power adjuster 26 receives the light outputted from the end of the optical amplifying fiber 21 and arriving through the optical coupler 27B, amplifies or attenuates this light, and outputs the amplified or attenuated light. Namely, the output light power adjuster 26 is an optical amplifier or an optical attenuator. The amplification rate or attenuation rate of the output light power adjuster 26 is variable.

The optical isolator 28 allows light coming from the first port 23a of the optical switch 23, to pass toward the optical coupler 27A, but does not allow light to pass in the opposite direction thereto.

The control part 20 imports the monitoring result of the light monitored by the monitor part 25, controls the output of excitation light from the excitation light source 22, controls the setting of the state of the optical switch 23 by the drive circuit 24, and controls the adjustment of optical power by the output light power adjuster 26.

In the laser device 2 constructed in this manner, the excitation light continuously outputted from the excitation light source 22 is supplied via the optical coupler 27A to the optical amplifying fiber 21 as a laser medium to excite the fluorescent element added in the optical amplifying fiber 21. Namely, these components act as an exciting means for continuously supplying the excitation energy to the optical amplifying fiber 21 as a laser medium.

When the first optical path between the first port 23a and the third port 23c of the optical switch 23 is in the optically transmittable state, the optical system including the optical amplifying fiber 21, optical coupler 27B, optical switch 23, optical isolator 28, and optical coupler 27A constitutes a ring type laser cavity, and the optical amplifying fiber 21 as a laser medium is placed on the resonance path of the laser cavity. When the second optical path between the second port 23b and the third port 23c of the optical switch 23 is in the optically transmittable state, the cavity loss of the laser cavity is maximum and the monitor part 25 monitors the light outputted from the optical amplifying fiber 21 as a laser medium. In this manner, the optical switch 23 and drive circuit 24 act as a Q-switch means for modulating the cavity loss of the laser cavity, and enable the laser cavity to output pulsed laser light.

Then the control part 20 performs such control as to stabilize the peak power or the energy of laser light pulses outputted in a state in which the cavity loss of the laser cavity is set at a second predetermined loss for oscillation of high-power pulses (i.e., in the state in which the first optical path is in the optically transmittable state), based on the optical power of light monitored by the monitor part 25 in a state in which the cavity loss of the laser cavity is set at a first predetermined loss for non-oscillation of high-power pulses (i.e., in the state in which the second optical path is in the optically transmittable state). More preferably, the control part 20 performs control to stabilize the peak power or the energy of laser light outputted when the cavity loss of the laser cavity is minimum, based on the optical power monitored by the monitor part 25 immediately before the cavity loss of the laser cavity becomes minimum.

More specifically, the control part 20 controls the magnitude of the excitation energy supplied from the excitation light source 22 to the optical amplifying fiber 21, thereby stabilizing the peak power or the energy of the output laser light. Alternatively, the control part 20 controls a gain or a loss of the output light power adjuster 26 to stabilize the peak power or the energy of the output laser light.

Since the control by the control part 20 in the laser light source 2 according to the present embodiment is also feedforward control, the correlation between output power values of excitation light from the excitation light source 22 or optical power adjustment amounts by the output light power adjuster 26, and pulse energy values of output pulsed light is measured in advance and stored in the control part 20. This correlation is preferably approximated by a linear function and in this case a load is small on a processor in the control part 20. The processor in the control part 20 may perform an arithmetic operation according to the linear function representing the above correlation, or may refer to a table storing the above correlation. The latter is preferred in terms of capability of high-speed processing. Since the present embodiment performs the feedforward control for individual pulses as described above, it is also able to stabilize the peak power or the energy of each pulse.

The present embodiment does not require insertion of a branching coupler for monitoring the output laser light, either, and thus the present embodiment reduces the number of parts and the number of connections, avoids a risk of optical damage, and suppresses an increase of insertion loss.

The above-described embodiments enable the stabilization of energy or power of output pulsed laser light.

What is claimed is:

1. A laser light source for implementing pulsed oscillation of laser light, comprising:
    a laser cavity in which a laser medium for generating emitted light with supply of excitation energy is placed on a resonance path; an exciting unit for continuously supplying excitation energy to the laser medium; a Q-switch unit located at a point of the laser cavity for modulating a cavity loss of the laser cavity; a monitor part for monitoring a power of light output from the Q-switch unit; and a control part for performing such control as to stabilize at least one of a peak power and an energy of laser light pulses outputted in a state in which the cavity loss of the laser cavity is set at a second predetermined loss for oscillation of high-power pulses, based on a power of emitted light monitored by the monitor part in a state in which the cavity loss of the laser cavity is set at a first predetermined loss for non-oscillation of high-power pulses, wherein the first predetermined loss is different from the second predetermined loss, wherein the control part controls the magnitude of the excitation energy supplied from the exciting unit based on the power of emitted light monitor part, thereby stabilizing at least one of the peak power and the energy of the output laser light.

2. The laser light source according to claim 1, wherein the control part performs feedback control of a physical parameter in the cavity which affects an output characteristic of the laser light source on the basis of the power of the emitted light monitored by the monitor part, thereby stabilizing at least one of the peak power and the energy of the output laser light.

3. The laser light source according to claim 1, comprising an output light power adjuster for amplifying or attenuating the laser light outputted from the laser cavity, wherein the control part controls at least one of a gain and a loss of the output light power adjuster, thereby stabilizing at least one of the peak power and the energy of the output laser light.

4. A laser light source for implementing pulsed oscillation of laser light, comprising:
    a laser cavity in which a laser medium for generating emitted light with supply of excitation energy is placed on a resonance path;
    an exciting unit for continuously supplying excitation energy to the laser medium;
    a monitor part for monitoring a power of light extracted at a point of the resonant path of the cavity from the laser medium in accordance with the supply of the excitation energy by the exciting unit;
    a Q-switch unit for modulating a cavity loss of the laser cavity; and
    a control part for performing such control as to stabilize at least one of a peak power and an energy of laser light pulses outputted in a state in which the cavity loss of the laser cavity is set at a second predetermined loss for oscillation of high-power pulses, based on a power of emitted light monitored by the monitor part in a state in which the cavity loss of the laser cavity is set at a first predetermined loss for non-oscillation of high-power pulses,
    wherein the laser cavity has an optical switch with the Q-switch unit, and wherein the Q-switch unit is so arranged that a pair of ports is used for constituting a part of the laser cavity and that a remaining port is used for monitoring part of an optical power in the laser cavity.

5. The laser light source according to claim 4, wherein the optical switch is one making use of an acoustooptic effect.

6. The laser light source according to claim 4, wherein the optical switch is one making use of an electrooptic effect.

7. The laser light source according to claim 4, wherein the optical switch is one making use of a piezooptic effect.

8. The laser light source according to claim 1, wherein the control part performs control based on the power of the emitted light monitored by the monitor part at an end of a period in which the cavity loss is set at the first predetermined loss, thereby stabilizing at least one of the peak power and the energy of the output laser light.

9. The laser light source according to claim 1,
    wherein the laser cavity includes at least one mirror, said at least one mirror constituting an end face of the resonant path.

10. The laser light source according to claim 1,
    wherein the exciting unit supplies excitation to the laser medium from outside of the resonance path.

11. A laser light source for implementing pulsed oscillation of laser light, comprising:
- a laser cavity in which a laser medium for generating emitted light with supply of excitation energy is placed on a resonance path;
- an exciting unit for continuously supplying excitation energy to the laser medium;
- a Q-switch unit located at a point of the laser cavity for modulating a cavity loss of the laser cavity;
- a monitor part for monitoring a power of light output from the Q-switch unit; and
- a control part for performing such control as to stabilize at least one of a peak power and an energy of laser light pulses outputted in a state in which the cavity loss of the laser cavity is set at a second predetermined loss for oscillation of high-power pulses, based on a power of emitted light monitored by the monitor part in a state in which the cavity loss of the laser cavity is set at a first predetermined loss for non-oscillation of high-power pulses,
- wherein the control part performs feedback control of a physical parameter in the cavity which affects an output characteristic of the laser light source on the basis of the power of the emitted light monitored by the monitor part, thereby stabilizing at least one of the peak power and the energy of the output laser light, and
- wherein the control part performs control based on the power of the emitted light monitored by the monitor part at an end of a period in which the cavity loss is set at the first predetermined loss.

12. A laser light source for implementing pulsed oscillation of laser light, comprising:
- a laser cavity in which a laser medium for generating emitted light with supply of excitation energy is placed on a resonance path;
- an exciting unit for continuously supplying excitation energy to the laser medium;
- a Q-switch unit located at a point of the laser cavity for modulating a cavity loss of the laser cavity:
- a monitor part for monitoring a power of light output from the Q-switch unit;
- a control part for performing such control as to stabilize at least one of a peak power and an energy of laser light pulses outputted in a state in which the cavity loss of the laser cavity is set at a second predetermined loss for oscillation of high-power pulses, based on a power of emitted light monitored by the monitor part in a state in which the cavity loss of the laser cavity is set at a first predetermined loss for non-oscillation of high-power pulses; and
- an output light power adjuster for amplifying or attenuating the laser light outputted from the laser cavity,
- wherein the control part controls at least one of a gain and a loss of the output light power adjuster, thereby stabilizing at least one of the peak power and the energy of the output laser light, and
- wherein the control part performs control based on the power of the emitted light monitored by the monitor part at an end of a period in which the cavity loss is set at the first predetermined loss.

13. A laser light source for implementing pulsed oscillation of laser light, comprising:
- a laser cavity in which a laser medium for generating emitted light with supply of excitation energy is placed on a resonance path;
- an exciting unit for continuously supplying excitation energy to the laser medium;
- a Q-switch unit located at a point of the laser cavity for modulating a cavity loss of the laser cavity;
- a monitor part for monitoring a power of light output from the Q-switch unit; and
- a control part for performing such control as to stabilize at least one of a peak power and an energy of laser light pulses outputted in a state in which the cavity loss of the laser cavity is set at a second predetermined loss for oscillation of high-power pulses, based on a power of emitted light monitored by the monitor part in a state in which the cavity loss of the laser cavity is set at a first predetermined loss for non-oscillation of high-power pulses,
- wherein the control part performs feed-forward control over output of excitation light from the excitation light source or over adjustment of optical power by the output light power adjuster, based on the optical power values monitored by the monitor part during periods in which the cavity loss of the laser cavity in the laser light source is not minimum.

14. The laser light source according to claim 13,
wherein the control part performs control based on the power of the emitted light monitored by the monitor part at an end of a period in which the cavity loss is set at the first predetermined loss.

15. A laser light source for implementing pulsed oscillation of laser light, comprising:
- a laser cavity in which a laser medium for generating emitted light with supply of excitation energy is placed on a resonance path;
- an exciting unit for continuously supplying excitation energy to the laser medium;
- a Q-switch unit located at a point of the laser cavity for modulating a cavity loss of the laser cavity;
- a monitor part for monitoring a power of light output from the Q-switch unit; and
- a control part for performing such control as to stabilize at least one of a peak power and an energy of laser light pulses outputted in a state in which the cavity loss of the laser cavity is set at a second predetermined loss for oscillation of high-power pulses, based on a power of emitted light monitored by the monitor part in a state in which the cavity loss of the laser cavity is set at a first predetermined loss for non-oscillation of high-power pulses,
- wherein the laser cavity has an optical switch with the Q-switch unit, and the Q-switch unit is so arranged that a pair of ports is used for constituting a part of the laser cavity and that a remaining port is used for monitoring part of an optical power in the laser cavity.

16. The laser light source according to claim 15,
wherein the optical switch is one making use of an acoustooptic effect.

17. The laser light source according to claim 15,
wherein the optical switch is one making use of an electrooptic effect.

18. The laser light source according to claim 15,
wherein the optical switch is one making use of a piezooptic effect.

* * * * *